April 5, 1938.    R. LEE    2,113,234
ELECTRICAL REGULATOR
Filed Nov. 11, 1935
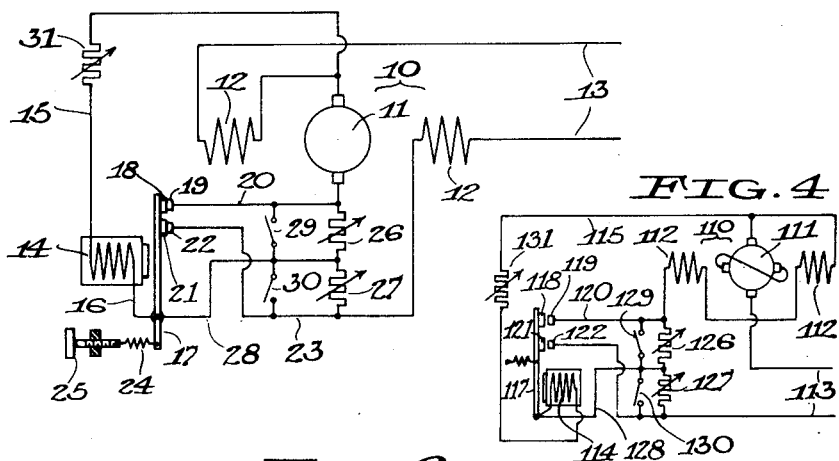
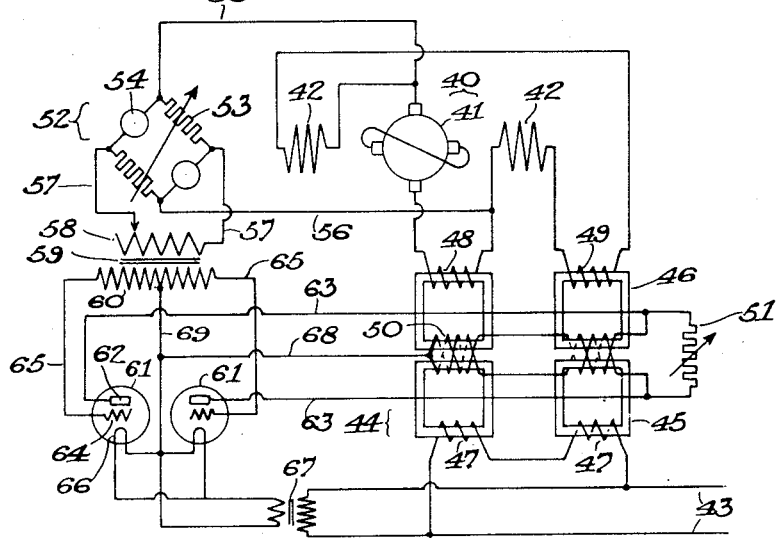
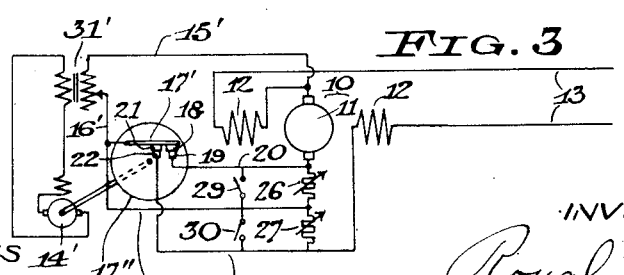
WITNESSES
L. E. Kilian
C. L. Waal
INVENTOR
Royal Lee
By R. H. Caldwell
ATTORNEY Patented Apr. 5, 1938

2,113,234

UNITED STATES PATENT OFFICE 2,113,234

ELECTRICAL REGULATOR

Royal Lee, Milwaukee, Wis., assignor to Lee Engineering Research Corporation, Milwaukee, Wis., a corporation of Wisconsin Application November 11, 1935, Serial No. 49,185

9 Claims. (Cl. 171—229)

The invention relates to electrical regulators and more particularly to systems for regulating the speed of electric motors.

An object of the invention is to provide a simple but effective speed regulating system for electric motors.

Another object of the invention is to provide a system for automatically regulating the speed of a motor of a type having series characteristics, and which will avoid the necessity for attaching speed controlling means on the motor shaft.

The invention further consists in the several features hereinafter described and claimed.

In the accompanying drawing, illustrating certain embodiments of the invention,

Fig. 1 is a diagrammatic view of one form of motor speed regulating system constructed in accordance with the invention;

Fig. 2 is a diagrammatic view of another form of motor speed regulating system;

Fig. 3 is a diagrammatic view of still another form of regulating system, and

Fig. 4 is a diagrammatic view of a further form of regulating system.

In that form of the invention shown in Fig. 1, 10 designates an electric motor of a variable speed type, here indicated to be a series motor having a rotor or armature 11 and field windings 12, the armature being connected between the field windings and the latter being connected to a source of current 13, preferably furnishing alternating current.

When a motor of this type is in operation, a voltage exists across the armature and increases as the speed of the motor increases. Use is made of this relation to govern the speed of the motor. A voltage coil or electromagnet 14 is connected to one brush for the motor armature by a conductor 15 and to the other brush for the armature by way of a conductor 16, a movable element or armature 17 of the electromagnet, a contact member 18 on the movable element engageable with a stationary contact member 19, and a conductor 20. The movable element 17 also carries a contact member 21 engageable with a stationary contact member 22, the latter being connected with one of the field windings 12 by a conductor 23, so as to complete the motor circuit when the several contact members are engaged. The movable element 17 is spring-urged to contact-making position, as by means of a coiled spring 24 adjusted by a set screw 25. The contact members form a pair of circuit-closers which operate simultaneously and which are connected in series in the motor circuit.

With the construction so far described, the two circuit-closers would carry the entire motor current, the break voltage being divided between them. However, if desired, part of the motor current may be diverted through series-connected resistors 26 and 27, which are shunted across the respective circuit-closers 18, 19, and 21, 22, the junction of the two resistors being connected to the movable element 17 by a conductor 28. The resistors 26 and 27 may be adjustable and are here indicated to be shunted by respective short-circuiting switches 29 and 30 which are normally open. When both of the switches 29 and 30 are closed, the motor will operate without regulation. An adjustable impedance 31 is preferably connected in the conductor 15 to form a speed control.

In the operation of the system of Fig. 1, current flows through the motor windings from the source 13 by way of the contact members 18, 19, and 21, 22, causing the motor armature 11 to rotate and increase in speed. As the motor speed increases, the voltage across the armature also increases and is impressed on the coil 14, causing the movable member 17 to be attracted and the contact members to separate. The motor current thereupon drops to a subnormal value determined by the resistors 26 and 27, thereby limiting the motor speed. The separation of the contact members also causes the current through the voltage coil 14 to drop to a subnormal value determined by the resistors 26 and 27, whereupon the spring-urged member 17 moves away from the coil 14 and recloses the circuit-closers 18, 19, and 21, 22. The motor current thereupon increases, tending to increase the motor speed, and the cycle of operation is repeated. The net result is that the speed of the motor is governed within close limits. The motor speed may be adjusted by varying the spring tension on the movable element 17 or by varying the value of the impedance 31. The movable element 17 either executes occasional movements or vibrates, as desired.

If the motor is operated with the switch 30 closed and the motor speed is permitted to rise above a predetermined value, the coil 14 will be energized and open the circuit-closers 18, 19 and 21, 22. The motor speed will thereupon drop either to zero or to a low value, since the voltage on the coil 14 will increase further and the coil will hold the swingable armature 17 attracted.

If the motor is operated with the switch 29 closed, a rise in motor speed will increase the voltage on the coil 14 and cause the contact members to separate, whereupon the motor speed drops. The voltage on the coil drops permitting the contact members to reclose. The cycle of operation is then repeated, affording a degree of speed regulation.

With both switches 29 and 30 open, the magnet coil will be more closely responsive to the voltage across the armature and good speed regulation will result, the opening and closing of the circuit-closers having little or no effect on the magnet coil, if the resistors 26 and 27 are suitably set.

In that form of the invention shown in Fig. 2, 40 designates a compensated repulsion motor having a rotor or armature 41 and field or stator windings 42, the rotor or armature being connected between the field windings. The motor is supplied with current from an alternating current source 43 by way of a transformer 44, here shown to be formed in two sections. Each transformer section comprises a pair of spaced cores 45 and 46, the cores 45 having primary windings 47 connected to the source 43, and the cores 46 having respective secondaries 48 and 49. The secondary 48 is connected between the armature and one of the field windings, and the secondary 49 is connected to those terminals of the field windings forming the motor terminals, so that the secondaries and motor windings are serially connected. Each pair of transformer cores 45 and 46 are coupled by a link winding 50, here indicated to be center-tapped, and preferably shunted by a variable impedance 51, the link winding forming a part of a link circuit, hereinafter described.

The voltage across the armature is utilized for controlling motor speed, and is applied to a bridge 52 of a well-known type comprising pairs of opposite impedances 53 and 54 of dissimilar characteristics. By way of illustration, the impedance 53 may be formed by adjustable wire wound resistors, and the impedances 54 may be formed by tungsten filament lamps. One terminal of the bridge is connected by a conductor 55 to one terminal of the motor armature. The opposite terminal of the bridge is connected by a conductor 56 to that terminal of one of the field windings which is connected to the armature through the transformer secondary 48. The other two terminals of the bridge are connected by conductors 57 to the adjustable or tapped primary 58 of a transformer 59, this transformer being a center-tapped secondary 60.

The center-tapped link winding 50 forms part of a link circuit which by way of illustration comprises a pair of space discharge devices 61, here indicated to be electrostatically controlled arc rectifiers, the anodes 62 of which are connected by conductors 63 to the outer terminals of the link winding. The control grids 64 of the rectifiers are connected by conductors 65 to the outer terminals of the center-tapped secondary 60. The cathodes 66 of the rectifiers are heated in any suitable manner such as by a transformer 67 connected to the source 43. The center-taps of the link winding 50 and the secondary 60 are connected by respective conductors 68 and 69 to the cathodes 66. The rectifiers are preferably of the mercury arc type having a relatively low voltage drop. The link winding 50 may be wound to produce any suitable voltage, preferably higher than the source voltage and rated motor voltage.

In the operation of the system of Fig. 2, current flows through the motor windings from the source 43 by way of the two-section transformer 44, causing the motor armature to revolve and increase in speed. As the motor speed increases the voltage across the bridge 52 increases, whereupon the voltage on the grids 64 of the arc rectifiers 61 decreases to a point sufficient to prevent the arc discharge. The current in the link circuit thereupon drops to a subnormal value determined by the adjustable impedance 51, and the voltage impressed on the motor by the secondaries 48 and 49 is reduced, preventing an increase in motor speed. The input voltage on the bridge drops and the grid voltage on the rectifiers increases to initiate the arc discharge, establishing the link circuit and tending to increase the motor speed. The cycle of operation is then repeated, and the net result is that the speed of the motor is governed within close limits. The motor speed may be adjusted by varying the bridge impedances 53. The connection of one input terminal of the bridge to a suitable intermediate point of the combined secondary 48, 49, serves to minimize the effect of the secondary voltage on the bridge, so that the bridge will be more closely responsive to armature voltage.

In that form of the invention shown in Fig. 3, the circuit-closers 18, 19, and 21, 22, form part of a centrifugal switch mechanism of any suitable construction actuated by an auxiliary electric motor 14' of the series type. The centrifugal switch mechanism may be generally similar to that shown in my United States Letters Patent No. 1,767,146, for Variable speed electric motor switches, issued June 24, 1930. The motor 14' can be relatively small compared with the motor 10 and is preferably of a high speed type. The movable contact members are here shown to be carried by a resilient member 17' mounted on a rotatable support 17'' driven by the motor 14'. The speed of the auxiliary motor 14' is responsive to the speed of the armature 11, and in the case of an alternating current system the auxiliary motor is preferably supplied with current through a transformer 31', the tapped or adjustable primary of which has one terminal connected to the armature 11 by a conductor 15', and the other terminal connected to the resilient switch member 17' by a conductor 16'. The rest of the system of Fig. 3 is similar to the system of Fig. 1. If desired, the tapped transformer 31' of Fig. 3 may be replaced by the adjustable impedance 31 of Fig. 1, in which event the motor 14' will be in series with the impedance, replacing the coil 14 of Fig. 1.

In the operation of the system of Fig. 3, current flows through the motor windings from the source 13 by way of the contact members 18, 19, and 21, 22, causing the motor armature 11 to rotate and increase in speed. As the motor speed increases, the voltage across the armature also increases and is impressed on the auxiliary motor 14' through the transformer 31', causing the armature of the latter motor to rotate at a high speed and eventually open the circuit-closers if the motor 10 rises above a predetermined speed, whereupon the speed of the motor 10 drops slightly. The voltage supplied to the auxiliary motor 14' thereupon drops, reclosing the circuit-closers 18, 19, and 21, 22, and the cycle of the operation is then repeated. The net result is that the speed of the main motor 10 is governed within close limits. The speed of the motor 10 may be adjusted by the taps on the transformer 31', or by the setting of the centrifugal switch mechanism. The relatively high speed of the centrifugal switch mechanism affords sensitive operation and permits the contact members to carry a heavy current.

In the form of system shown in Fig. 4, 110 designates a motor of the compensated repulsion type having a rotor or armature 111 and stator or field windings 112, the motor being connected to an alternating current source 113. In this system, the variation in voltage across the field windings is utilized to control the speed of the motor. A voltage coil or electromagnet 114 is connected to one terminal of the field windings by a conductor 115, and to the other terminal of the field windings by way of a movable element or armature 117 of the electromagnet, a contact member 118 on the movable element engageable with a stationary contact member 119, and a conductor 120. The movable element 117 also carries a contact member 121 engageable with a stationary contact member, the latter being connected to one conductor of the source 113, so as to complete the motor circuit when the several contact members are engaged. The movable element 117 is spring-urged to contact-breaking position and is attracted by the coil 114 to contact-closing position. The contact members form a pair of circuit-closers which operate simultaneously and which are connected in series in the motor circuit.

Part of the motor circuit is diverted through adjustable series-connected circuit-closers 126 and 127 which are shunted across the respective circuit-closers 118, 119, and 121, 122, the junction of the two resistors being connected to the movable element 117 by a conductor 128. The resistors are shunted by respective short-circuiting switches 129 and 130 which are normally open. When both of the switches 129 and 130 are closed, the motor will operate without regulation. An adjustable impedance 131 is preferably connected in the conductor 115 to form a speed control.

In the operation of the system of Fig. 4, current flows through the motor windings from the source 113 by way of the resistors 126 and 127, causing the motor armature 111 to rotate and energizing the coil 114. The movable member 117 is thereby attracted, closing the circuit-closers 118, 119, and 121, 122, whereupon the motor current increases since the resistors 126 and 127 are short-circuited by these circuit-closers. As the motor speed increases the voltage across the field windings decreases reducing the excitation of the coil 114 and permitting the spring-urged member 117 to open the circuit-closers 118, 119, and 121, 122, whereupon the motor current drops and limits the speed of the motor. The cycle of operation is then repeated, thereby governing the speed of the motor. The movable element 117 either executes occasional movements or vibrates, as desired. By suitably adjusting the resistors 126 and 127, the magnet coil 114 will be closely responsive to the voltage across the field windings, the opening and closing of the circuit-closers having little or no effect on the magnet coil.

It will be obvious that the system of Fig. 4 can be modified by substituting a suitable motor-driven centrifugal switch mechanism for the coil-operated switch mechanism, in much the same manner that the system of Fig. 1 is modified to form the system of Fig. 3. The substituted centrifugal switch mechanism would, of course, close the contacts on increase of speed to correspond with the circuit-closer means 18, 19, and 21, 22.

The type of motor indicated in Figs. 2 and 4 may be used in the systems of Figs. 1 and 3, and vice versa.

In each system the motor speed is regulated by electrical means and without requiring the attachment of a rotary controlling member, such as a centrifugal switch, on the shaft of the motor being regulated. The regulating means can be placed at a distance from the motor being regulated and can be serviced or replaced without disturbing the motor.

What I claim as new and desire to secure by Letters Patent is:

1. In combination, an electric motor having an armature and a field winding, a source of current for the motor, a pair of serially connected circuit-closers in series with the armature for interrupting at least a part of the motor current, and electromagnetic means responsive to armature voltage for operating said circuit-closers to regulate the speed of the motor, said electromagnetic means having a circuit connection with said armature through one of said circuit-closers, and the other circuit-closer being interposed between said source of current and said electromagnetic means.

2. In combination, an electric motor having an armature, a source of current for the motor, a voltage bridge responsive to armature voltage, space discharge means controlled by said bridge, and transformer means connecting said source and said motor and having a circuit connection with said space discharge means to regulate the speed of the motor.

3. In combination, an electric motor having an armature, a source of current for the motor, transformer means connecting said source and motor and having a link winding, and means responsive to armature voltage for controlling said link winding to regulate the speed of the motor.

4. In combination, an electric motor, a source of current for the motor, centrifugal speed-controlling circuit-closer means connected in circuit with said motor, a second motor for controlling said circuit-closer means, and means responsive to an electrical condition of said first motor for controlling the speed of said second motor.

5. In combination, an electric motor having an armature, a source of current for the motor, a pair of serially connected circuit-closers in series with said armature, a pair of impedances shunted by said respective circuit-closers, and electromagnetic means responsive to armature voltage for operating said circuit-closers to regulate the speed of the motor, said electromagnetic means having a circuit connection with said armature through one of said circuit-closers and the impedance connected across said circuit-closer, and the other circuit-closer and its associated impedance being interposed between said source of current and said electromagnetic means.

6. In combination, an electric motor having an armature, a source of current for the motor, a pair of serially connected, simultaneously operable circuit-closers in series with said armature, a pair of impedances shunted by said respective circuit-closers, and electromagnetic means responsive to armature voltage for simultaneously operating said circuit-closers to regulate the speed of the motor, said electromagnetic means having a circuit connection with said armature through one of said circuit-closers and the impedance connected across said circuit-closer, and the other circuit-closer and its associated impedance being interposed between said source of current and said electromagnetic means.

7. In combination, a variable speed electric motor having an armature, a plurality of series-connected impedances in series with said armature, a source of current for the motor, and means responsive to armature voltage to intermittently vary the effective value of said impedances to thereby regulate the motor current and the speed of the motor, said means including a voltage-responsive device connected in circuit with said armature, at least one but less than all of said impedances being interposed between said device and said armature.

8. In combination, an electric motor having an armature, a source of current for said motor, centrifugal speed-controlling circuit-closer means connected in circuit with said motor, a second motor for controlling said circuit-closer means, and means responsive to the armature voltage of said first motor for controlling the speed of said second motor.

9. In combination, an electric motor having an armature, a source of current for the motor, a pair of serially connected speed-controlling circuit-closers in series with said armature, a pair of impedances shunted by said respective circuit-closers, electromagnetic means responsive to the armature voltage of said first motor and comprising a second electric motor for operating said circuit-closers, said electromagnetic means having a circuit connection with said armature through one of said circuit-closers and its associated impedance, and the other circuit-closer and its associated impedance being interposed between said source of current and said electromagnetic means.

ROYAL LEE.